United States Patent
Angstmann et al.

(10) Patent No.: US 12,264,548 B2
(45) Date of Patent: Apr. 1, 2025

(54) WELL CONTROL SEALING SYSTEM

(71) Applicant: Kinetic Pressure Control Ltd., Houston, TX (US)

(72) Inventors: Steven Angstmann, Houston, TX (US); Bobby Gallagher, Houston, TX (US); Billy Gallagher, Houston, TX (US); Sean Laird, Houston, TX (US)

(73) Assignee: Kinetic Pressure Control Ltd., Houston, TX (US)

( * ) Notice: Subject to any disclaimer, the term of this patent is extended or adjusted under 35 U.S.C. 154(b) by 65 days.

(21) Appl. No.: 17/789,207

(22) PCT Filed: Jan. 6, 2021

(86) PCT No.: PCT/US2021/012325
§ 371 (c)(1),
(2) Date: Jun. 26, 2022

(87) PCT Pub. No.: WO2021/141999
PCT Pub. Date: Jul. 15, 2021

(65) Prior Publication Data
US 2023/0203908 A1    Jun. 29, 2023

Related U.S. Application Data

(60) Provisional application No. 62/957,891, filed on Jan. 7, 2020.

(51) Int. Cl.
*E21B 33/06* (2006.01)

(52) U.S. Cl.
CPC .................. *E21B 33/063* (2013.01)

(58) Field of Classification Search
CPC .............................. E21B 33/062; E21B 33/063
USPC .................................... 251/1.1, 1.3, 358
See application file for complete search history.

(56) References Cited

U.S. PATENT DOCUMENTS

| | | | | |
|---|---|---|---|---|
| 2,841,429 A | * | 7/1958 | McCuistion | F16J 15/3236 277/587 |
| 3,009,721 A | * | 11/1961 | Newton | F16J 15/166 277/467 |
| 3,078,865 A | * | 2/1963 | Estes | F16K 3/36 137/246.22 |
| 3,504,885 A | * | 4/1970 | Hulsey | F16K 3/0227 251/328 |
| 3,827,673 A | * | 8/1974 | Houlgrave | F16K 3/36 251/360 |

(Continued)

OTHER PUBLICATIONS

International Search Report and Written Opinion of the International Searching Authority, International Application No. PCT/US2021/012325, dated May 3, 2021.

*Primary Examiner* — Daphne M Barry
(74) *Attorney, Agent, or Firm* — Victor H. Segura

(57) ABSTRACT

A blowout preventer includes a main body having a through bore and defining a passage transverse to the through bore. A seal is disposed in the main body and arranged to restrict fluid flow from the through bore to the passage. The seal comprises a seal body formed as a closed loop having an upper surface and a lower surface, wherein the seal body comprises an inner wall and an outer wall. The lower surface comprises at least one wing extending laterally from the outer surface to provide a lateral sealing surface. The upper surface comprises at least one raised portion to provide a sealing surface.

19 Claims, 9 Drawing Sheets

(56) References Cited

U.S. PATENT DOCUMENTS

| | | | | |
|---|---|---|---|---|
| 4,612,983 A | * | 9/1986 | Karr, Jr. | E21B 33/063 |
| | | | | 251/327 |
| 9,249,888 B2 | * | 2/2016 | McEvoy | F16K 3/0263 |
| 11,104,489 B2 | * | 8/2021 | McBride | B65D 88/76 |
| 2008/0135791 A1 | * | 6/2008 | Juda | E21B 33/062 |
| | | | | 251/1.3 |
| 2012/0193874 A1 | | 8/2012 | Melancon et al. | |
| 2013/0043657 A1 | | 2/2013 | Carringer | |
| 2017/0075364 A1 | | 3/2017 | Patterson et al. | |
| 2018/0080300 A1 | * | 3/2018 | Angstmann | E21B 33/063 |
| 2019/0203555 A1 | | 7/2019 | Gallagher et al. | |

\* cited by examiner

WELL CONTROL SEALING SYSTEM

BACKGROUND

The present disclosure relates generally to sealing mechanisms. More specifically, the present disclosure relates to sealing systems for implementation with well control systems.

Blowout preventers (BOPs) for oil and gas wells are used to prevent potentially catastrophic events known as blowouts, where high well pressures and uncontrolled flow from a subsurface formation into the well can expel tubing (e.g., drill pipe and well casing), tools and drilling fluid out of a well. Blowouts present a serious safety hazard to drilling crews, the drilling rig and the environment and can be extremely costly. Typically BOPs have "rams" that are opened and closed by actuators. The most common type of actuator is operated hydraulically to push closure elements across a through bore in a BOP housing close the well. In some cases, the rams have shears to cut through a drill string or other tool which may be in the well at the time it is necessary to close the BOP.

Pyrotechnic gas pressure operated BOP rams have also been proposed. An example of such a pyrotechnic gas pressure operated BOP ram is described in U.S. Pat. No. 10,465,466 issued to Kinetic Pressure Control Limited. A pyrotechnic gas pressure is used to urge a gate to accelerate in a bore, whereby kinetic energy of the gate may be used to shear any devices disposed in a BOP housing through bore, thus closing the BOP. Such rams are referred to as "kinetic" BOP rams. In such kinetic BOP rams, a gate traverses through the BOP housing to shear an object within the through bore and close off the well bore. The housing passage for the gate needs to provide adequate sealing to prevent undesired fluid migration and maintain system integrity.

One aspect of the present disclosure is a blowout preventer including a main body having a through bore and defining a passage transverse to the through bore. A seal is disposed in the passage and arranged to restrict fluid flow from the through bore to the passage. The seal comprises a seal body formed as a closed loop having an upper surface and a lower surface, wherein the seal body comprises an inner wall and an outer wall. The lower surface comprises at least one wing extending laterally from the outer surface to provide a lateral sealing surface. The upper surface comprises at least one raised portion to provide a sealing surface.

In some embodiments, at least one of the inner wall and the outer wall comprises a relief, and wherein a reinforcement is disposed in the relief.

In some embodiments, the reinforcement is made from a material having a lower resilience than a material used to form the seal body.

In some embodiments, the reinforcement comprises metal.

In some embodiments, the reinforcement comprises a spring.

In some embodiments, the spring is shaped as a toroid.

In some embodiments, the seal body comprise a resilient material.

In some embodiments, the resilient material comprises elastomer.

Some embodiments further comprise at least one reinforcement ring formed in the seal body.

Some embodiments comprise two reinforcement rings disposed in the seal body.

In some embodiments, the seal lower surface comprises an inner wing and an outer wing extending laterally from the outer surface.

Some embodiments further comprise an O-ring in a recess between the inner wing and the outer wing.

In some embodiments, the seal is disposed on an insert configured for disposal within the main body.

In some embodiments, the seal is disposed in a channel in the insert.

In some embodiments, the at least one wing is urged into contact with a wall of the insert channel.

In some embodiments, the channel is in fluid communication with a source of fluid pressure in a space of the channel below the seal.

In some embodiments, an edge of the channel comprises a sloped surface to communicate fluid pressure in the passage to a space of the channel below the seal.

Some embodiments further comprise a ring cutter disposed in the passage and the seal is configured to engage a face of the ring cutter.

Some embodiments further comprise an insert disposed in the main body. The insert comprises a first insert segment and a second insert segment. The seal is disposed on one of first insert segment or the second insert segment.

Some embodiments further comprise a seal in each of the first insert segment and second insert segment.

Another aspect of this disclosure relates to a method for operating a blowout preventer (BOP). The BOP comprises a main body having a through bore. The main body defines a passage transverse to the through bore. The BOP comprises a seal disposed in the main body. The seal comprises a seal body formed as a closed loop having an upper surface and a lower surface. The seal body also comprises an inner wall and an outer wall, wherein the lower surface comprises at least one wing extending laterally from the outer surface to provide a lateral sealing surface. The upper surface comprises at least one raised portion to provide a sealing surface. The method comprises applying fluid pressure to the seal to energize the seal to restrict fluid flow from the through bore to the passage.

In some embodiments, the seal is disposed on an insert configured for disposal within the main body.

In some embodiments, the seal is disposed within a channel in the insert.

In some embodiments, applying fluid pressure comprises actuating a charge.

In some embodiments, applying fluid pressure comprises fluid pressure originating from a pressurized container.

Other aspects and advantages will be apparent from the description and claims that follow.

DETAILED DESCRIPTION

Figure 1A:
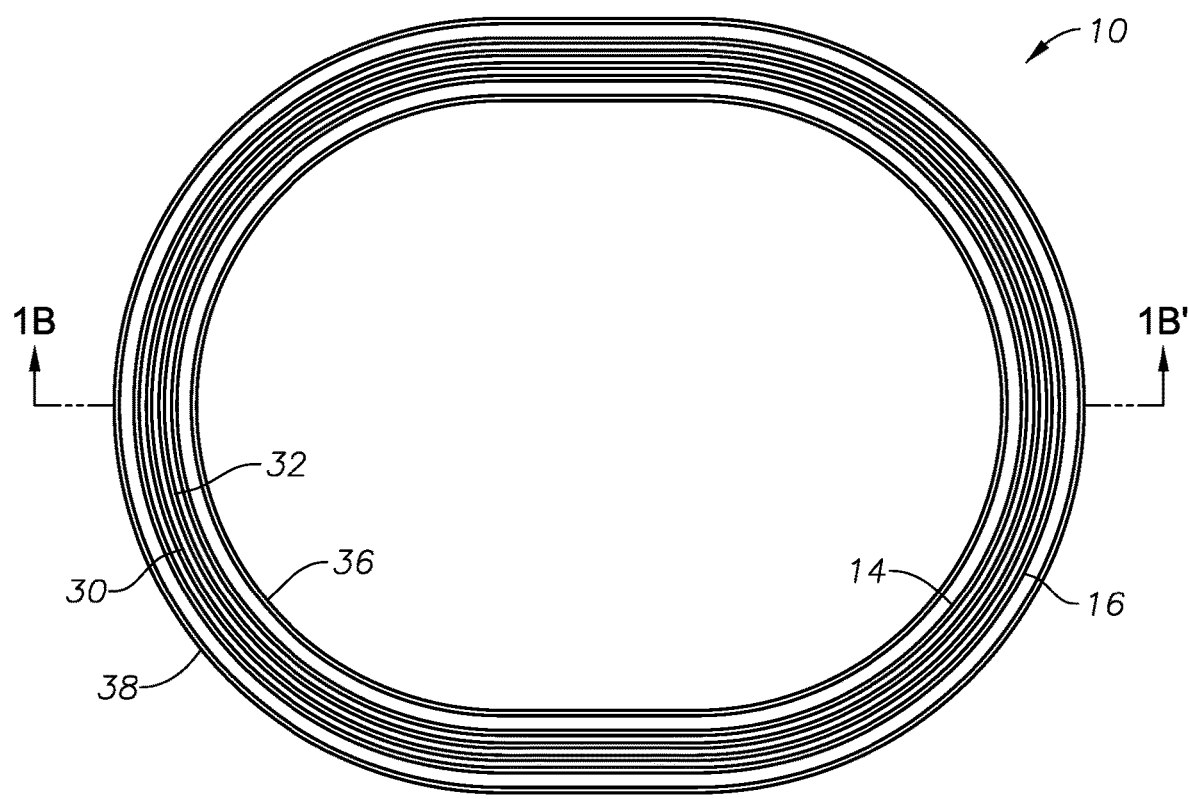
FIG. 1A shows a plan view of an example embodiment of a seal according to this disclosure.

Illustrative embodiments are disclosed herein. In the interest of clarity, not all features of an actual implementation are necessarily described. In the development of any such actual implementation, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure. The disclosed embodiments are not to be limited to the precise arrangements and configurations shown in the figures, in which like reference numerals may identify like elements. Also, the figures are not necessarily drawn to scale, and certain features may be shown exaggerated in scale or in generalized or schematic form, in the interest of clarity and conciseness.

FIG. 1A shows a plan view of an example embodiment of a seal 10 according to this disclosure. The seal 10 may be shaped as an annular ring. The embodiment in FIG. 1A may have an oval or "racetrack" configuration. Embodiments of the seal 10 can be implemented with various dimensions along either or both the major axis and the minor axis, and some embodiments may also be implemented in circular configurations. It will be appreciated by those skilled in the art that the seal 10 according to this disclosure may be formed from conventional materials suitable for the desired application as known in the art (e.g., resilient materials, elastomers, rubber compounds, synthetic elastomeric materials, composites, etc.).

Figure 1B:
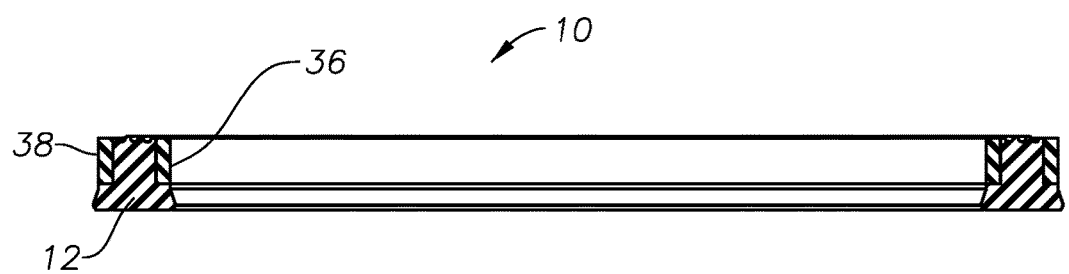
FIG. 1B shows a cross-section of the seal along section line 1B-1B' in FIG. 1A.

FIG. 1B shows a cross-section of the example embodiment of the seal 10 along section line 1B-1B' in FIG. 1A. The seal 10 includes a centrally disposed body 12, which can vary in height (thickness) depending on the desired application for the seal 10.

Figure 1C:
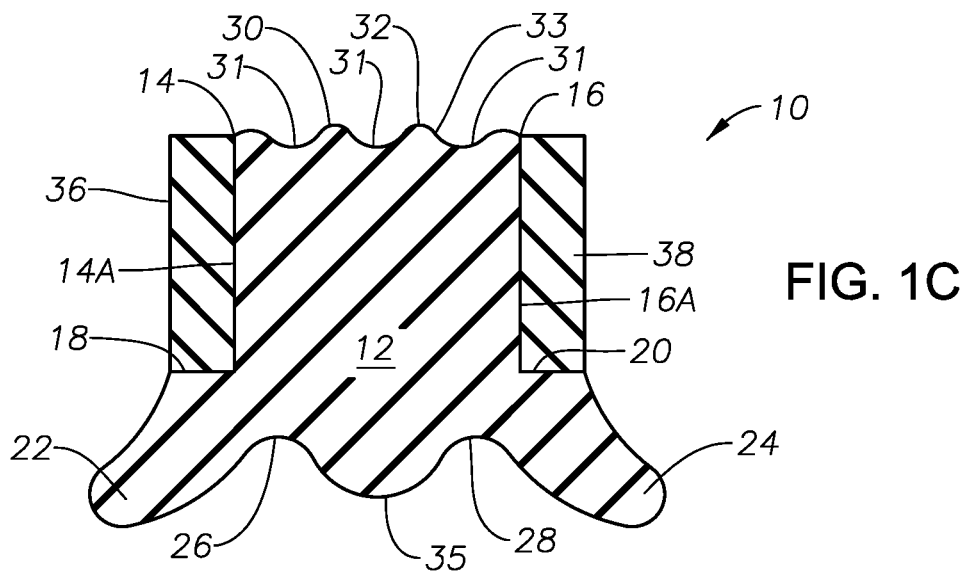
FIG. 1C shows an enlarged view of a cross-section of the seal 10 indicated in detail B of FIG. 1B.

FIG. 1C shows an enlarged view of a cross-section of the example embodiment of the seal 10 as indicated in detail B of FIG. 1B. One side of the seal 10 forms an inner diameter wall 14 and the opposite side forms an exterior diameter wall 16. The positions of the respective walls 14, 16 with reference to the seal 10 are shown in FIG. 1A. Each wall 14, 16 extends from the top surface 33 of the seal 10 toward the bottom surface 35 of the seal 10, forming a smooth annular surface. The lower section of each wall 14, 16 may extend outward, respectively, forming an inner ledge or shoulder 18 and an outer ledge or shoulder 20. Below the inner shoulder 18; the lower body portion of the seal 10 defines a sloping surface extending outward (laterally) from the body 12 of the seal 10 to form an inner wing 22. Similarly, the lower body portion of the seal 10 extending from the outer shoulder 20 defines a sloping surface extending outward (laterally) from the body 12 of the seal 10 to form an outer wing 24. The bottom surface 35 of the seal 10 may comprise a pair of concentric (with reference to the entire seal 10) recesses or grooves 26, 28 extending along the entire loop of the seal, shown in FIG. 1C as an indentation or recess adjacent to each wing 22, 24. The recesses or grooves 26, 28 enable each wing 22, 24 to have flexibility to spread outward or compress inward (laterally) depending on the forces applied to the seal 10 (such forces further described below). A tip of each wing 22, 24 may be shaped to provide effective sealing with minimal surface contact area of each wing with respect to a surface to which the wings are intended to seal, as further explained herein.

In some embodiments, the seal 10 includes one or more raised portions 30, 32 extending from an upper seal surface 33. Each raised portion 30, 32 may be formed as a ring extending along the entire loop of the upper seal surface 33. Example positions of the raised portions 30, 32 with reference to the entire seal 10 are shown in FIG. 1A. In some embodiments, the upper seal surface 33 may also be configured with corresponding recessed portions 31 formed as grooves, recesses or trenches running along the entire loop of the upper seal surface 33. When the seal 10 is installed in an application wherein the raised portions 30, 32 contact another surface in a compressive sealing engagement (e.g., see FIG. 3), the recessed portions 31 provide space for the material of the raised portions 30, 32 to be compressed and displaced.

An inner element 36, e.g., a structural reinforcement, may disposed in a relief 14A formed on the inner circumference of the seal 10. The inner element 36 is configured to abut against the surface of the inner wall 14, its upper end being flush with the top edge of the seal 10 wall and disposed on the inner shoulder 18 at its lower end. An outer element 38, e.g., a structural reinforcement, may fitted over the seal 10 in a relief 16A formed on the outer circumference, its upper end being flush with the upper surface 33 and disposed on the outer shoulder 20 at its lower end. In some embodiments, the upper end of the inner 36 and/or outer 38 elements may be slightly recessed from the upper surface 33. "Upper" and "lower" as used in this description mean only the orientation with reference to the drawing figures and are not intended to limit the physical orientation of the seal 10 in any application for the seal 10. The inner and outer elements 36, 38 may each comprise a solid annular ring or a spring (e.g., shaped as a toroid) respectively sized to conform to the ID and OD of the body 12 (see FIG. 1A). The elements 36, 38 may be formed from conventional materials suitable for the desired application as known in the art. In some embodiments, the inner and/or outer elements 36, 38 may be formed from harder or more rigid materials (e.g., metal, hard thermoplastic, etc.) than the material used to form the seal body 12. The inner and outer elements 36, 38 may be affixed to the seal body 12 by any suitable means as known in the art (e.g., heat fusing, adhesives, interference fit, etc.). In some embodiments, the elements 36, 38 may be molded into the seal body 12 using manufacturing techniques as known in the art.

Figure 2:
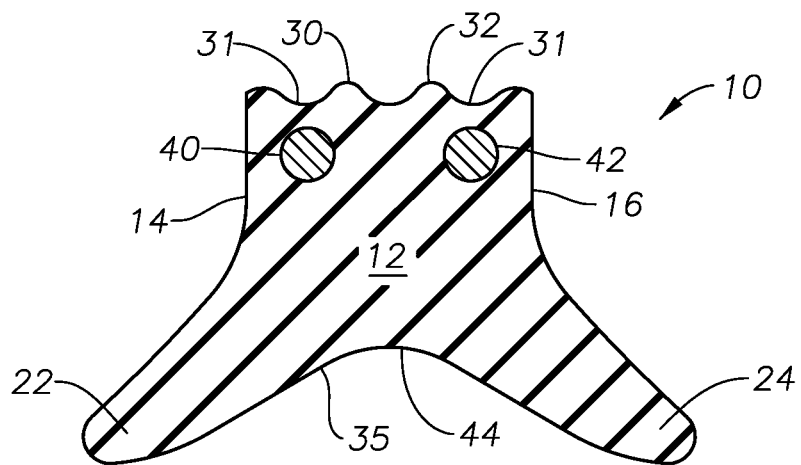
FIG. 2 shows a cross-section of another embodiment of a seal according to this disclosure.

FIG. 2 shows a cross-section of another embodiment of a seal 10 according to this disclosure. The seal 10 may comprise a pair of rings 40, 42 embedded within the seal body 12. The rings 40, 42 are disposed near the upper surface of the seal 10, with one ring 40 placed close to the inner wall 14 and the other ring 42 placed close the outer wall 16. The rings 40, 42 may be formed from a less resilient material than the seal body 12, such as metal or hard plastic, and may be formed as a one-piece or multi-piece loop extending along the entire loop of the seal 10. In some embodiments, the rings 40, 42 comprise metallic springs, e.g., made from spring metal such as phosphor bronze. The rings 40, 42 may be molded within the seal 10 during fabrication of the seal 10 in any manner known in the art. The rings 40, 42 may provide additional structural support to the seal 10 and may provide resistance to seal extrusion in certain implementations (further described below). The bottom surface 35 of the seal 10 may be configured with a single groove 44 running along the entire loop of the seal, depicted as an indentation or recess disposed symmetrically between the wings 22, 24. Other seal 10 embodiments may be configured with more than one recess or groove 44, as shown in the embodiment of FIG. 1C.

Figure 3:
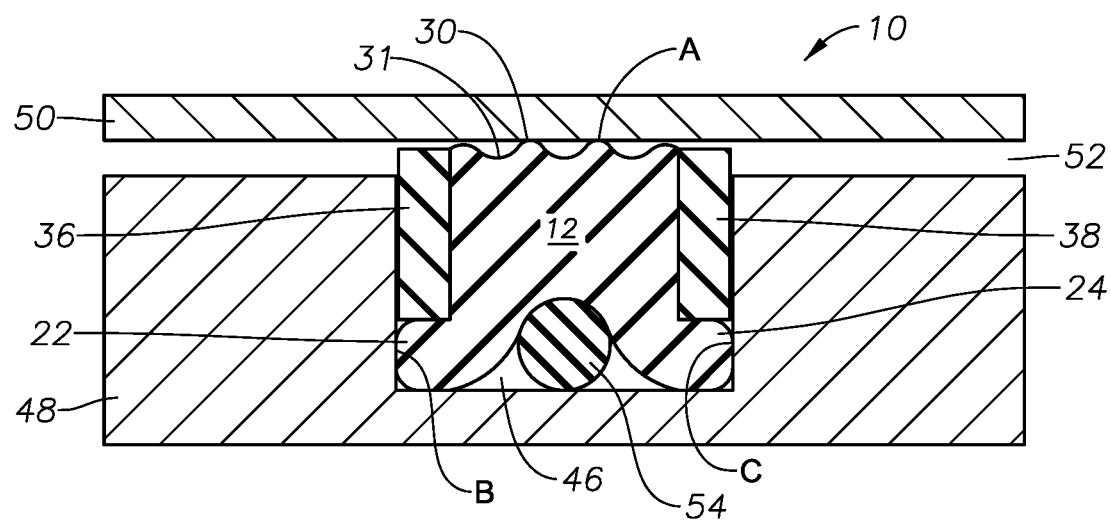
FIG. 3 shows a cross-section of another seal embodiment according to this disclosure.

FIG. 3 shows a cross-section of another example embodiment of a seal 10 according to this disclosure installed within a seal groove or channel 46 formed in a first component 48. The seal 10 is shown compressed between the first component 48 and a second component 50. The first 48 and second 50 components represent an article of manufacture with the components 48, 50 disposed close to one another yet providing a passage, orifice, or separation 52 otherwise allowing fluid (e.g., liquid and/or gas) flow in either direction absent the presence of the seal 10 as shown. It will be appreciated that such a configuration to seal such a passage is well known in articles of manufacture. As installed, the seal 10 is compressed within the channel 46 such that the upper surface of the seal 10 contacts the second component 50. The one or more raised portions 30 on the seal 10 are compressed against the second component 50 surface, forming a sealing face engagement. In some embodiments, an O-ring 54 may be disposed at the bottom of the seal 10, residing between the wings 22, 24. The O-ring 54 aids spreading the wings 22, 24 outwards from the seal body 12, forming a radial sealing engagement B, C against the side walls of the channel 46. As shown in FIG. 3, the seal 10 provides face A and radial B, C sealing against fluid passage along the separation 52. Although shown in a cross-sectional view in FIG. 3, it will be appreciated that the seal 10 is formed as an annular ring or loop in its entirety, similar to the embodiment shown in FIG. 1A.

The present embodiment of the seal 10 may also be configured with inner 36 and outer 38 elements as shown in FIG. 1C. In addition to providing structural support, the inner 36 and outer 38 elements may reduce or prevent wear on the seal 10 edges and resist extrusion of the seal 10 from the channel 46 in applications where the first 48 and/or second 50 component is configured for movement in relation to the other component (e.g., when the installation is such that the second component 50 is configured for sliding motion (left to right in FIG. 3) over the first component 48). Although the seal 10 in FIG. 3 is shown as energized, the seals may also be implemented in configurations where the seal is initially unenergized.

Figure 4A:
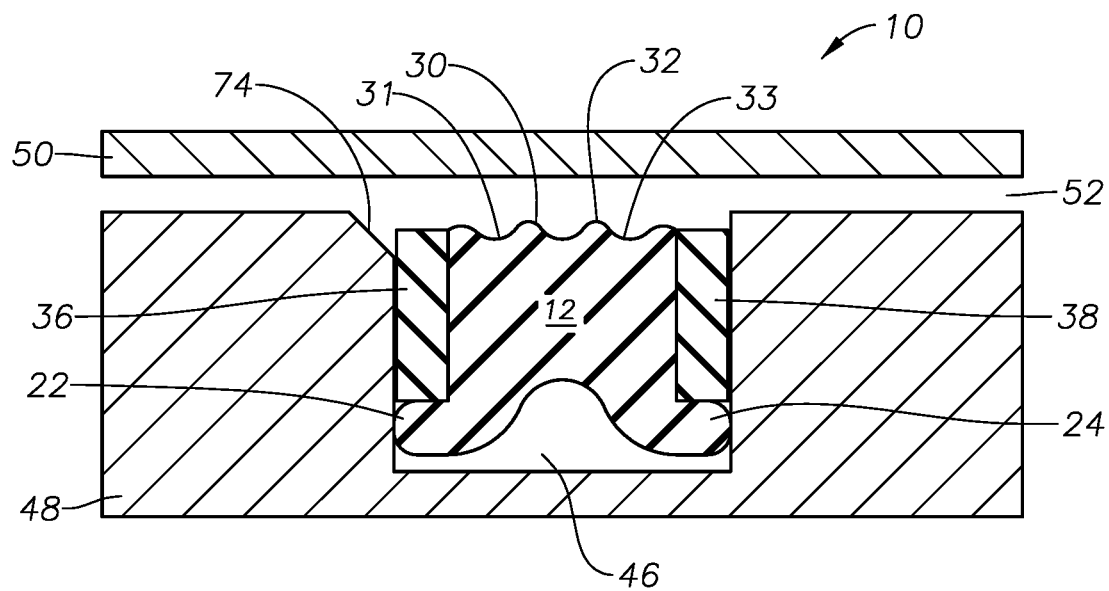
FIG. 4A shows a cross-section of another embodiment according to this disclosure.

FIG. 4A shows a cross-section of another embodiment according to this disclosure. A seal 10 is installed to sit within a channel 46 without providing sealing engagement at its upper surface 33. In such applications, the seal 10 provides lateral sealing against both sides of the channel 46 through the wings 22, 24, without the face A (see FIG. 4B) being in contact with the second component 50. The first component 48 is configured wherein the channel 46 has a deviated edge 74. Embodiments may be implemented with the deviated edge 74 comprising: a taper descending into the channel 46; one or more slots running along the surface of the edge; or porting formed at the edge. The deviated edge 74 can be formed on either or both sides of the channel 46. In the unenergized state, fluid pressure on the space beneath the seal 10 is equal to the fluid pressure in the separation 52 between the first 48 and second 50 components. In this implementation, a structure (e.g., 100 in FIG. 5) comprising first 48 and second 50 components (e.g., 118A, 118B in FIG. 5) may be designed such that fluid pressure in the separation or passage 52 undergoes a significant and rapid increase under certain conditions. Such conditions may comprise, for example, ignition of a charge (e.g., 114 in FIG. 7) generating a gas expanding into the separation or passage 52.

Figure 4B:
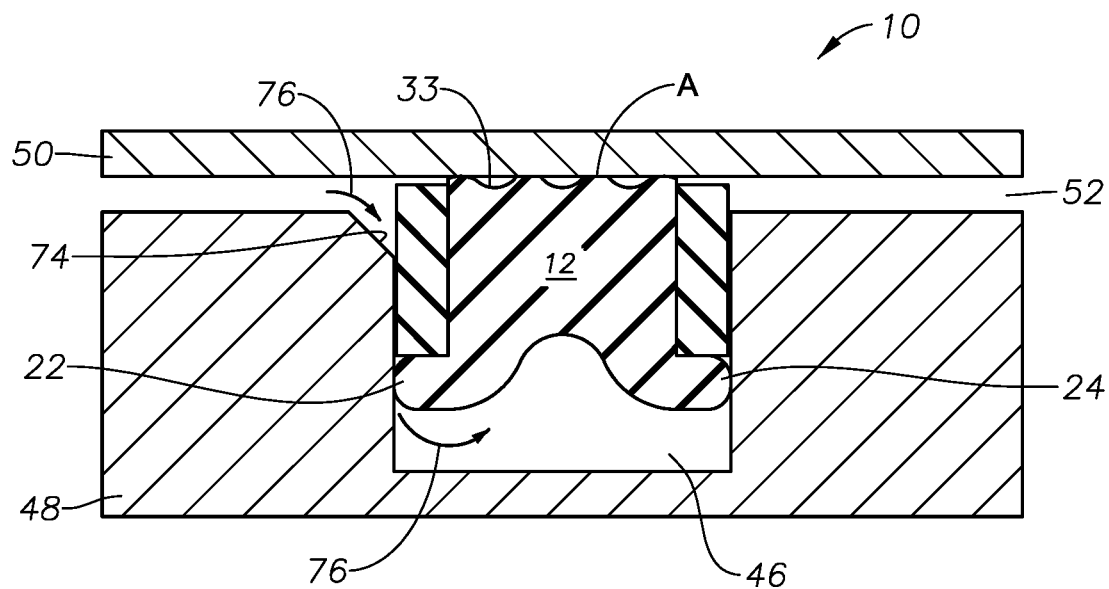
FIG. 4B shows a high-pressure gas traversing a deviated edge and moving into a channel.

FIG. 4B shows such a high-pressure gas (arrow 76) traversing the deviated edge 74 and moving into the channel 46. The flexible wing 22 on the seal 10 permits the high-pressure gas 76 to fill space in the channel 46 beneath the seal 10. The rapid increase in gas pressure acting on the space beneath the seal 10 urges the seal 10 upward in the channel 46 to engage the seal face A against the second component 50, thereby blocking passage of the gas 76 to the other side of the seal 10. After a seal is established by energizing the seal 10, the gas pressure in the channel 46 beneath the seal urges the seal into contact with the second component 50, thereby maintaining a fluid tight seal between the first component 48 and the second component 50. Any of the disclosed seal 10 embodiments may be used as shown in FIGS. 4A and 4B for such activation by application of pressure in the passage 52.

Figure 5:
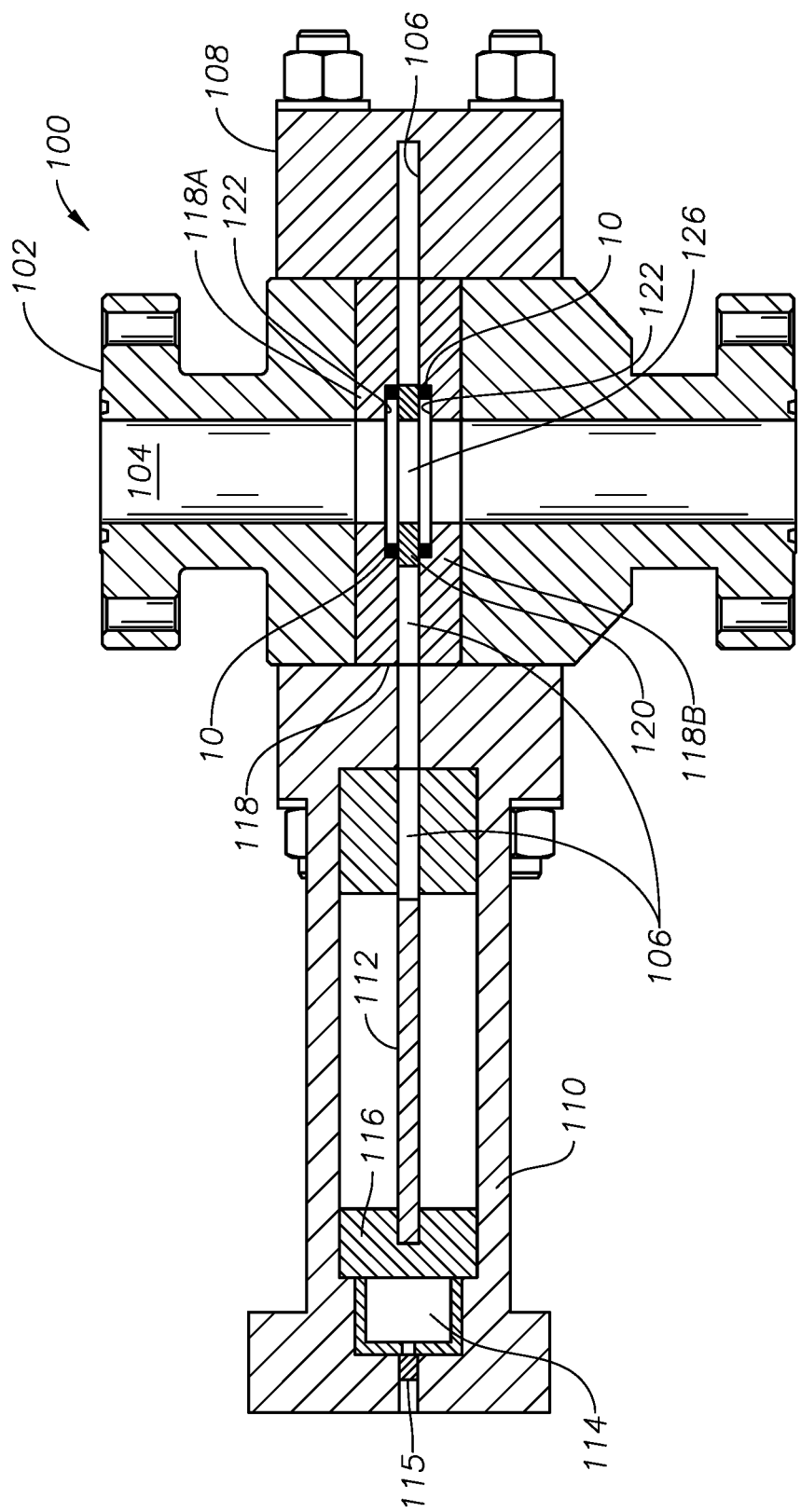
FIG. 5 shows a sectioned elevational view of an example embodiment of a pyrotechnic gas pressure operated blowout preventer (BOP).

Turning to FIG. 5, there is shown a sectioned elevational view of an example embodiment of a pyrotechnic gas pressure operated blowout preventer (BOP) 100, referred to as a "kinetic" BOP. The general structure of the kinetic BOP 100 may be made from steel or similar high strength material. The kinetic BOP 100 comprises a main body 102 having a through bore 104. The main body 102 may be coupled to a wellhead, to another BOP (kinetic or other type) or to a similar structure (not shown), so that flow along the through bore 104 may be closed off by operating the kinetic BOP 100. A passageway 106 that is oriented transversely to the through bore 104 is formed in a cover 108 coupled to one side of the main body 102. The passageway 106 extends though the main body 102 and into a housing defining a pressure chamber 110 adjacent to an opposed side of the main body. The embodiment shown in FIG. 5 is formed with a main body 102 joined to a separate cover 108 and pressure chamber 110, however, such structure is not a limit on the scope of the disclosure. The main body 102 may be shaped to define a pressure chamber and/or a cover in a unitary structure. The passageway 106 provides a travel path for a gate 112. The travel path (passageway 106) enables the gate 112 to attain sufficient velocity resulting from actuation of a pyrotechnic charge 114 and subsequent gas expansion against a piston 116 such that kinetic energy in the gate 112 may be sufficient to sever any device disposed in the through bore 104 and to enable the gate 112 to extend into the passageway 106 across the through bore 104. The pyrotechnic charge 114 is actuated by an initiator 115. Additional description of the operation of a kinetic BOP 100 may be found in U.S. Pat. No. 10,465,466 issued to Angstmann et al. and assigned to the present assignee.

An insert 118 may be disposed in a suitably sized bore 102A in the main body to provide effective closure between the through bore 104 and the passageway 106. Such closure provides that fluid pressure in the through bore 104 is excluded from the passageway 106. A ring cutter 120 may be positioned in the passageway 106 within the main body 102. The ring cutter 120 comprises a central opening 126 (also in FIG. 6), which is shown in alignment with the through bore 104 in FIG. 5. The ring cutter 120 severs any device in the through bore 104 when the ring cutter 120 is moved into the through bore 104 by the gate 112 after actuation of the pyrotechnic charge 114. When the gate 112 is disposed across the through bore 104 after actuation of the charge 114, the through bore 104 is thereby effectively closed to flow by the gate 112 being disposed inside the insert 118 thus displacing the ring cutter 120.

The insert 118 comprises a pair of seals 10 according to the present disclosure. One seal 10 is mounted in a channel 122 formed on a first insert segment 118A. The other seal 10 is mounted in a channel 122 formed on a second insert segment 118B (see FIG. 6). The seals 10 are disposed on the insert segments 118A, 118B such that the top surface of each seal (e.g., 33 in FIG. 1C) faces the passageway 106 (i.e., transverse to the through bore 104). Each seal 10 is disposed in the respective channel 122 in an unenergized state, i.e., the respective wings (22, 24 in FIG. 4A) in the seals are in contact with the corresponding channel 122 walls to provide lateral sealing, but the top surface seal faces are not in contact with any surface, similar to the configuration shown in FIG. 4A (component 48 in FIG. 4A representing the corresponding insert segment 118A, 118B). The seals 10 may be positioned on the insert 118 such that the central opening (see FIG. 1A) of each seal 10 is concentric with the through bore 104.

Figure 6:
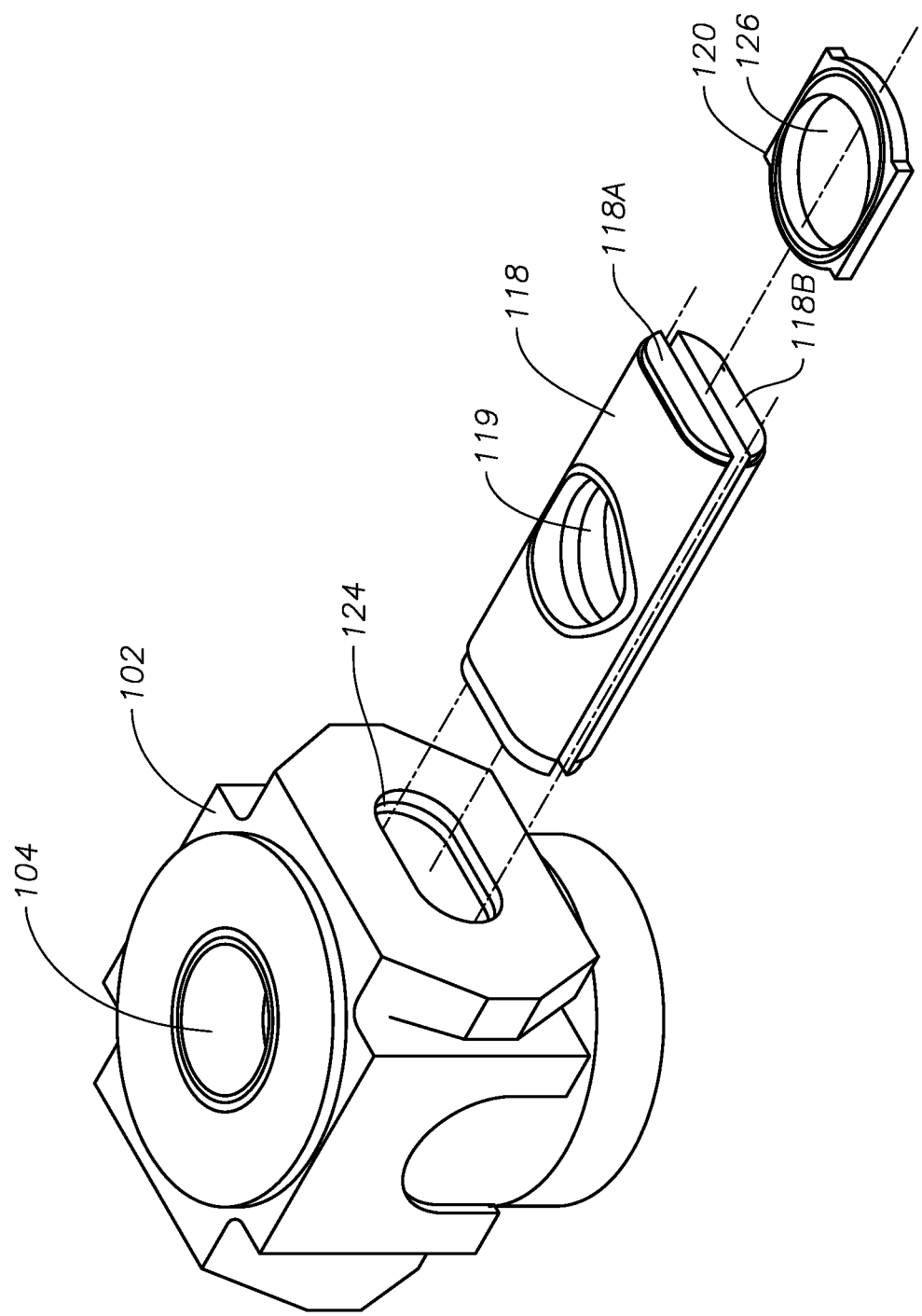
FIG. 6 shows a schematic of an embodiment of a main body of a kinetic BOP.

FIG. 6 shows a schematic of an embodiment of a main body 102 of a kinetic BOP 100 (similar to the main body 102 of FIG. 5) with an expanded view of an insert 118 embodiment according to this disclosure. In FIG. 6, the main body 102 is shown without a cover 106 or pressure chamber 110 (see FIG. 5) for clarity of illustration. The insert 118 may be configured as a modular assembly having a first insert segment 118A and a second insert segment 118B. The first 118A and second 118B insert segments may be formed from any suitable material, e.g., steel or other high strength metal, and can vary in size and dimensions depending on the dimensions and the pressure rating of the main body 102 used for the desired BOP application. Each insert segment 118A, 118B has an opening 119 formed proximate its central region, passing all the way through the respective insert segment body, thus defining an opening through the insert 118. The main body 102 has a central bore 124 transversely formed therein (with reference to the through bore 104) to receive the insert 118. When disposed in the main body 102, the first 118A and second 118B insert segments are positioned such that their respective openings 119 are substantially aligned with the through bore 104 in the main body 102 (as shown in FIG. 5). The ring cutter 120 may be configured in a generally rectangular shape with flat, planar surfaces. An opening 126 is formed in the central region of the ring cutter 120, passing from the top surface through to the bottom surface of the ring cutter 120. Referring back to FIG. 5, when the first 118A and second 118B insert segments are positioned within the main body 102, the two insert segments 118A, 118B define the passageway 106.

Figure 7:
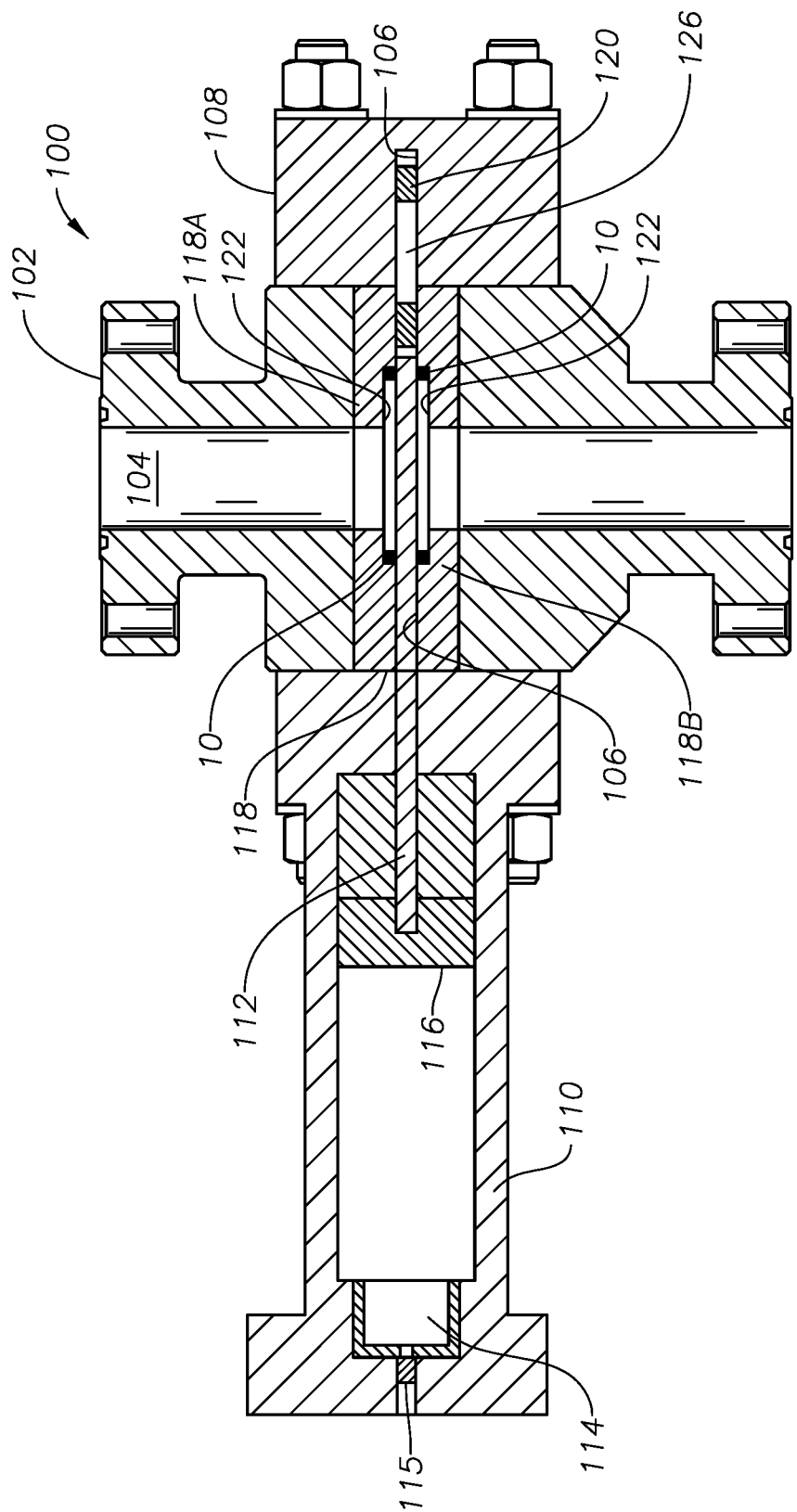
FIG. 7 shows a cross-section view of the BOP of FIG. 5 where a sufficient expansion of hot gases has occurred after activation of a pyrotechnic charge.

FIG. 7 shows a cross-section view of the BOP 100 of FIG. 5 where a sufficient expansion of hot gases has occurred after activation of the pyrotechnic charge 114 to displace the piston 116 and consequently the gate 112. At this stage, the piston 116 and gate 112 have accelerated through the passageway 106 and the ring cutter 120 has sheared through anything that may have been in the through bore 104. Expanding gases behind the piston 116 propelled the gate 112 and ring cutter 120 past the through bore 104. In the process, some of the high-pressure gas flowed along the passageway 106 (76 in FIG. 4B) to energize the seals 10 in the manner depicted and described with respect to FIG. 4B. Once the piston 116 and gate 112 have traversed the passageway 106 and come to a stop, the gate 112 remains in position within the through bore 104. With the seals 10 energized, the seals 10 provide lateral sealing in the respective channels 122 via the wings 22, 24 and the upper surface 33 seal faces seal against the gate 112 surfaces to stop any flow of fluids from the through bore 104 and into the passage 106, thereby closing the through bore 104 to fluid flow.

Figure 8:
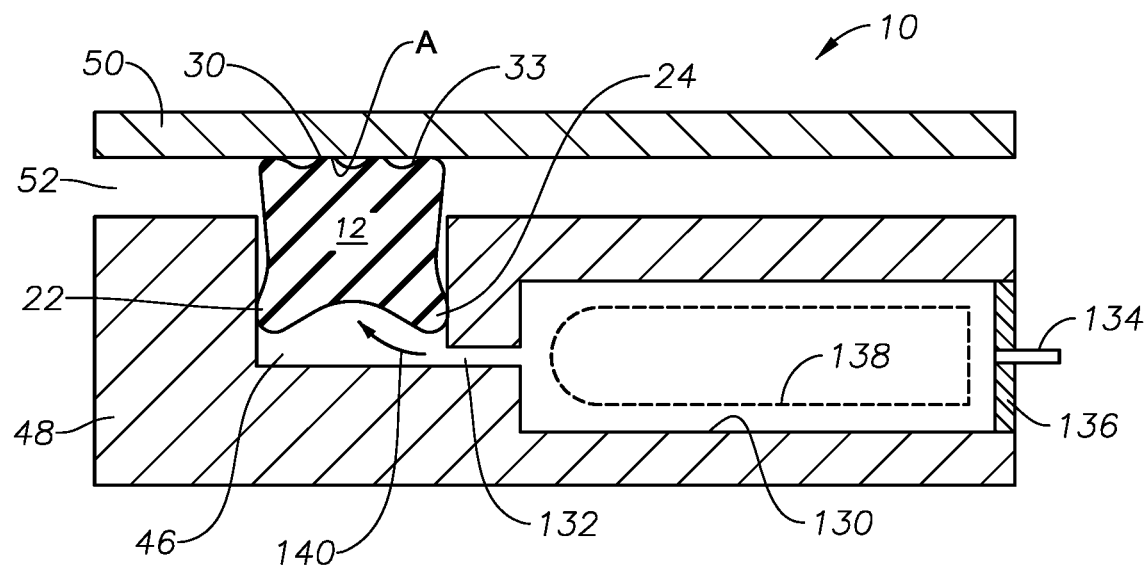
FIG. 8 shows a cross-section of another embodiment of a seal according to this disclosure.

FIG. 8 shows a cross-section of another embodiment of a seal 10 according to this disclosure. A seal 10 is installed within a channel 46 between a first component 48 and a second component 50. In this embodiment, the first component 48 includes a chamber 130 formed therein and in fluid communication with the recess or channel 46 through a port 132. The chamber 130 may provide a sealed space configured to contain a fluid (e.g., nitrogen or other gas) under pressure. It will be appreciated by those skilled in the art that the chamber 130 may be formed in the first component 48 by any suitable means as known in the art (e.g., a machined cavity having a sealing end cap, by casting, by 3D printing, etc.). In some embodiments, the chamber 130 may be pressurized by injecting a suitable fluid, e.g., gas, through a nozzle 134 on an end cap 136 (e.g., a threaded cap or plug), which end cap 136 closes the chamber 130 at one end as shown in FIG. 8. In some embodiments, a pressurized gas cartridge 138 may be disposed in the chamber 130 and used to fill the chamber 130 with any suitable gas as known in the art. In some embodiments, the chamber 130 may be pressurized with a suitable liquid (e.g., oil or grease). In some embodiments, a setting or curing filler compound (e.g., epoxy or thermoplastic) may be used to pressurize the chamber 130 and thereby energize the seal 10.

When the seal 10 is installed in the channel 46, the wings 22, 24 on the seal 10 extend out laterally to simultaneously contact both sides of the channel 46. Once fluid pressure (shown by arrow 140) is applied to the space in the channel 46 underneath the seal 10 (e.g., through port 132), the seal 10 moves upward as a result of the fact that the channel 46 side walls are closed to fluid flow by the wings 22, 24 on the seal body 12. The higher the fluid pressure 140, the greater the sealing forces applied to the wings 22, 24. As such, the wings 22, 24 provide that the seal 10 is pressure activated and the seal 10 is thereby energized.

As shown in FIG. 8, the raised portion(s) 30 at the top of the seal 10 also provide(s) a seal against the face A by reason of engagement with the second component 50. Sealing by face A may also be activated by the pressurized fluid 140 acting on the area beneath the seal 10 in the recess or channel 46. In some embodiments, such as the embodiment shown in FIG. 3, the inclusion of an O-ring 54 between the wings 22, 24 may provide seal activation before fluid pressure 140 is applied, thereby providing a low-pressure sealing capability as well as higher pressure capability after fluid pressure activation of the seal 10.

Figure 9:
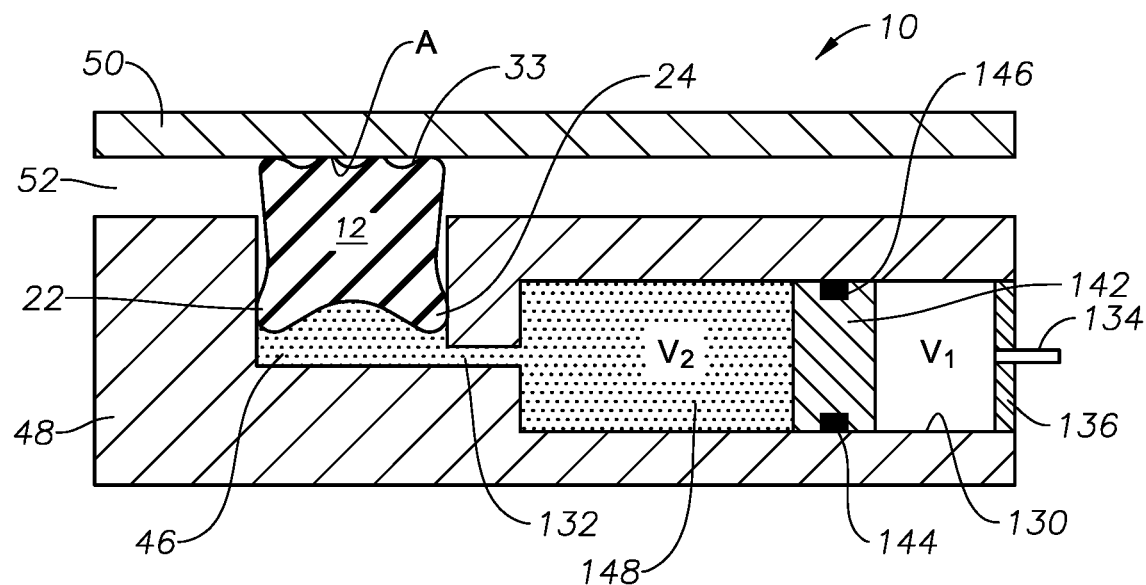
FIG. 9 shows another embodiment of a seal according to this disclosure.

FIG. 9 shows another embodiment of a seal 10 according to this disclosure. The seal 10 is shown installed within a channel 46 to provide sealing between a first component 48 and a and second component 50. As with the embodiment shown in FIG. 8, the first component 48 includes a chamber 130 in fluid communication with the channel 46 through a port 132. In the present embodiment, the chamber 130 may include a piston 142 configured to slide within the chamber 130, separating the chamber into two volumes V1, V2. In the present example embodiment, the chamber 130 may be cylindrically shaped. Within a cylindrically shaped chamber 130, the piston 142 may comprise a disc or flat cylinder having seal 144 such as an O-ring disposed in a groove 146 formed on the circumference of the piston 142. The piston 142 may be formed of any suitable material. In some embodiments, the chamber 130 may be sealed using metal-to-metal seals as the seal 144 on the piston 142. Volume V1 of the chamber 130 may be pressurized by injecting a suitable fluid, e.g., gas, through the nozzle 134 on the end cap 136 (sealing the chamber at one end as explained with reference to FIG. 8. Fluid pressure may also be provided, e.g., by a pressurized gas cartridge (138 in FIG. 8), or any other suitable means as described herein. On the other side of the piston 142, volume V2 of the chamber 130 may contain a semi-solid compound 148 (e.g., a very high viscosity or thixotropic fluid such as a suitable grease or other semi-solid compound as known in the art). The volume V2 may be pre-loaded with the semi-solid compound 148 during assembly of the structure. Use of the semi-solid compound 148 in volume V2 may provide an advantage in some implementations where higher pressures need to be applied to activate the seal 10 since the semi-solid compound 148 is less prone to leakage than, for example, liquid or gas.

Although the seals 10 in FIGS. 8 and 9 are shown as energized (i.e., with the pressurized gas/compound acting on the space beneath the seal), the seals may also be implemented in configurations where the seals are installed unenergized. A seal 10 may be placed to initially sit in the channel 46 without application of the pressurized gas 140 or compound 148. In such applications, the seal 10 provides sealing against both sides of the channel 46 through the wings 22, 24, without the face A being in contact with the second component 50. Then, at a subsequent time, fluid under pressure (e.g., gas 140 or compound 148) can be released to act on the space in the channel 46 beneath the seal 10. Since the channel 46 sides are closed, the seal 10 will then move upwards to engage the face A with the second component 50, establishing a seal on face A. It will be appreciated that the pressures placed on the face A and sides (e.g., wings 22, 24) of the seal 10 could be different depending on the implementation. Control of these pressures allows seal by the face A to be maintained as desired. It will also be appreciated by those skilled in the art that some embodiments may be configured with conventional electronics and software to automatically and autonomously pressurize the chamber 130 to energize the seals 10, e.g., by introducing pressure to the chamber 130 by release of pressurized gas through the nozzle 134, to establish a face seal at face A at a desired time or under certain conditions.

Figure 10:
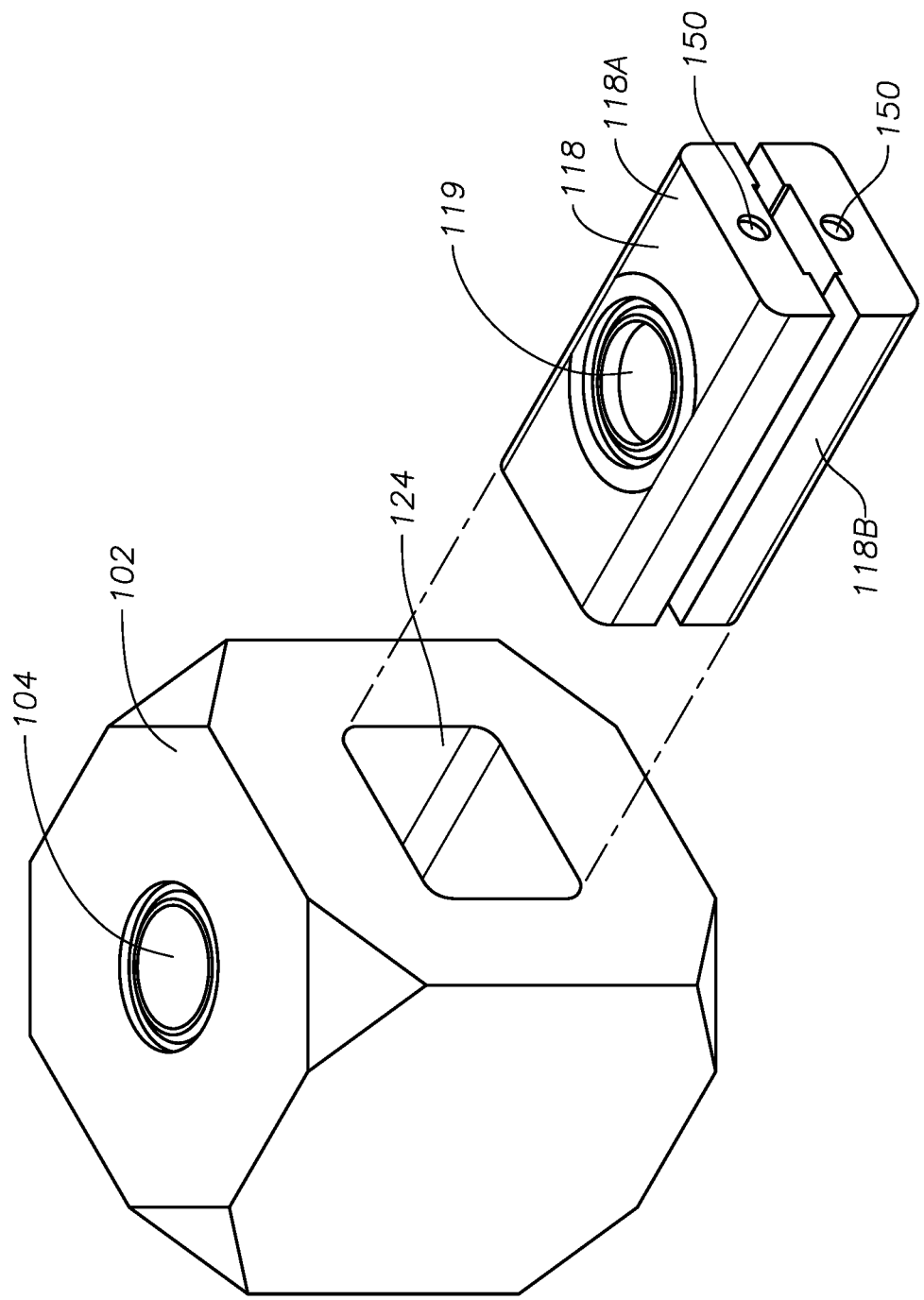
FIG. 10 shows a schematic of another main body embodiment of a kinetic BOP.

FIG. 10 shows a schematic of another embodiment of a main body 102 of a kinetic BOP 100 (similar to the embodiments of FIGS. 5-7) with an expanded view of an insert 118 embodiment according to this disclosure. For clarity of illustration, the main body 102 is shown without a cover (108 in FIG. 7) or pressure chamber (110 in FIG. 5). The insert 118 may be configured as a modular assembly comprising a first insert segment 118A and a second insert segment 118B. Each insert segment 118A, 118B is configured with any embodiment of a pressurized seal 10 (see FIGS. 8-9) and may have an opening or port 150 at each longitudinal end, leading to the chamber 130 as shown in and described with reference to FIGS. 8-9. The ports 150 may be sealed using end caps (e.g., as shown at 136 in FIGS. 8-9).

Figure 11:
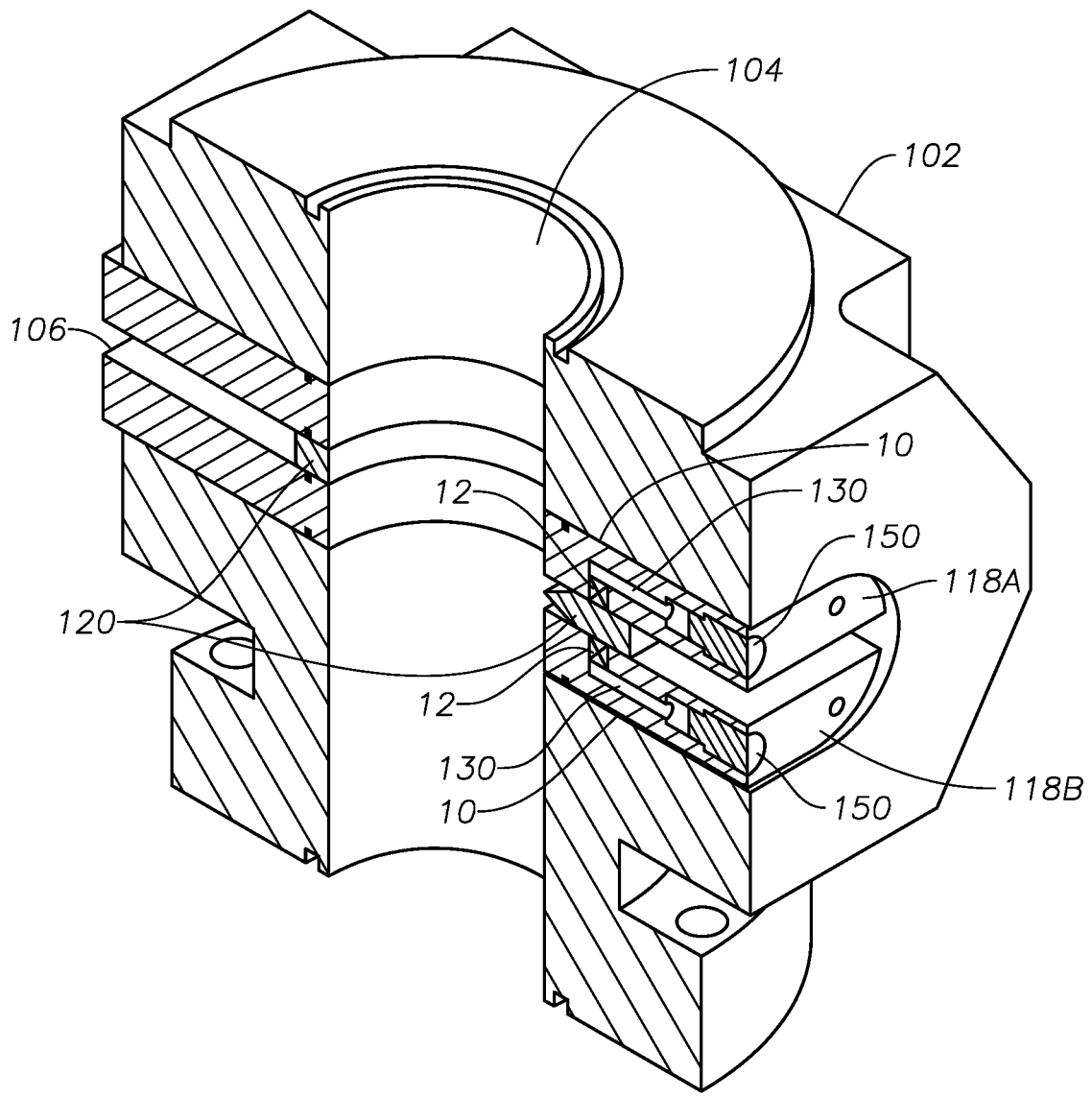
FIG. 11 shows an elevational partial cut-away view of a main body embodiment of a kinetic BOP with an insert mounted within the main body.

FIG. 11 shows an elevational partial cut-away view of an embodiment of the main body 102 of a kinetic BOP 100 with an insert 118 (formed from segments 118A, 118B) mounted within the main body 102. Each insert segment 118A, 118B includes an embodiment of a pressurized seal 10 such as shown in and explained with reference to FIGS. 8-9. The seals 10 are shown disposed in the insert segments 118A, 118B such that the face of each seal body 12 respectively engages the upper and lower surface of the ring cutter 120. For clarity of illustration, a partial cutaway of the insert 118 is shown. It will be appreciated that the respective seal bodies 12 in the insert segments 118A, 118B are configured in a closed loop pattern (See seal 10 in FIG. 1A) to provide sealing around the circumference of the through bore 104. As previously discussed, some embodiments may be configured with conventional electronics and software to automatically and autonomously activate and energize the seals 10 to establish both lateral and face sealing at a desired time or under certain conditions.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

The invention claimed is:
1. A blowout preventer (BOP), comprising:
a main body having a through bore, the main body defining a passage transverse to the through bore;
a seal disposed in the main body and arranged to restrict fluid flow from the through bore to the passage, the seal comprising,
a seal body formed as a closed loop having an upper surface and a lower surface,
wherein the seal body comprises an inner wall and an outer wall,
wherein the lower surface comprises at least one wing extending laterally from the outer surface to provide a lateral sealing surface, and
wherein the upper surface comprises at least one raised portion to provide a sealing surface;
the seal mounted within a channel on an insert disposed in the main body with the raised portion facing the passage,
wherein the raised portion is configured to engage a surface of an object in the passage;
wherein the channel is in fluid communication with a source of fluid pressure in a space of the channel below the seal.
2. The BOP of claim 1 wherein at least one of the inner wall and the outer wall comprises a relief, and wherein a reinforcement is disposed in the relief.

3. The BOP of claim 2 wherein the reinforcement is made from a material having a lower resilience than a material used to form the seal body.

4. The BOP of claim 2 wherein the reinforcement comprises a spring.

5. The BOP of claim 1 further comprising at least one reinforcement ring formed in the seal body.

6. The BOP of claim 5 further comprising two reinforcement rings disposed in the seal body.

7. The BOP of claim 1 wherein the seal lower surface comprises an inner wing and an outer wing extending laterally from the outer surface.

8. The BOP of claim 7 further comprising an O-ring disposed in a recess disposed between the inner wing and the outer wing.

9. The BOP of claim 1 wherein an edge of the channel comprises a sloped surface to communicate fluid pressure in the passage to the space of the channel below the seal.

10. The BOP of claim 1 further comprising a ring cutter disposed in the passage, wherein the seal is configured to engage a face of the ring cutter.

11. The BOP of claim 1, wherein the insert comprises:
a first insert segment;
a second insert segment; and
wherein the seal is disposed on one of the first insert segment or second insert segment.

12. The BOP of claim 11 wherein the first and second insert segments each comprise a seal disposed thereon.

13. A method for operating a blowout preventer (BOP), the BOP comprising a main body having a through bore, the main body defining a passage transverse to the through bore, the BOP comprising a seal disposed in the main body, the seal comprising a seal body formed as a closed loop having an upper surface and a lower surface, wherein the seal body comprises an inner wall and an outer wall, wherein the lower surface comprises at least one wing extending laterally from the outer surface to provide a lateral sealing surface, and wherein the upper surface comprises at least one raised portion to provide a sealing surface; the seal disposed in a channel of an insert in the main body with the raised portion facing the passage, wherein the raised portion is configured to engage a surface of an object in the passage, the method comprising:

applying fluid pressure to the seal in a space of the channel below the seal to energize the seal to restrict fluid flow from the through bore to the passage.

14. The method of claim 13 wherein applying fluid pressure comprises actuating a charge.

15. The method of claim 13 wherein applying fluid pressure comprises fluid pressure originating from a pressurized container.

16. A blowout preventer (BOP), comprising:
a main body having a through bore;
an insert disposed in the main body;
the insert defining a passage transverse to the through bore;
at least one seal disposed within a channel on the insert; and
the at least one seal comprising a seal body formed as a closed loop having an upper surface facing the transverse passage,
wherein the upper surface is configured to engage a surface of an object in the passage;
wherein the channel is in fluid communication with a source of fluid pressure in a space of the channel below the at least one seal.

17. The BOP of claim 16, wherein the at least one seal is configured for energization to engage the upper surface with the surface of the object in the passage.

18. The BOP of claim 16 wherein the insert comprises:
a first insert segment having a first seal formed as a closed loop disposed within a channel thereon;
the first seal configured with an upper surface facing the transverse passage to engage a first surface of the object in the passage;
a second segment having a second seal formed as a closed loop disposed within a channel thereon;
the second seal configured with an upper surface facing the transverse passage to engage a second surface of the object in the passage.

19. The BOP of claim 18, wherein each of the first and second seals are configured for energization to respectively engage the seal upper surfaces with the first and second surfaces of the object in the passage.

* * * * *